No. 770,297. PATENTED SEPT. 20, 1904.
J. W. LEDOUX.
FLUID METER.
APPLICATION FILED JULY 11, 1903.
NO MODEL. 3 SHEETS—SHEET 1.

WITNESSES:

INVENTOR
J. W. Ledoux
BY
C. N. Butler
ATTORNEY.

No. 770,297. PATENTED SEPT. 20, 1904.
J. W. LEDOUX.
FLUID METER.
APPLICATION FILED JULY 11, 1903.
NO MODEL. 3 SHEETS—SHEET 2.
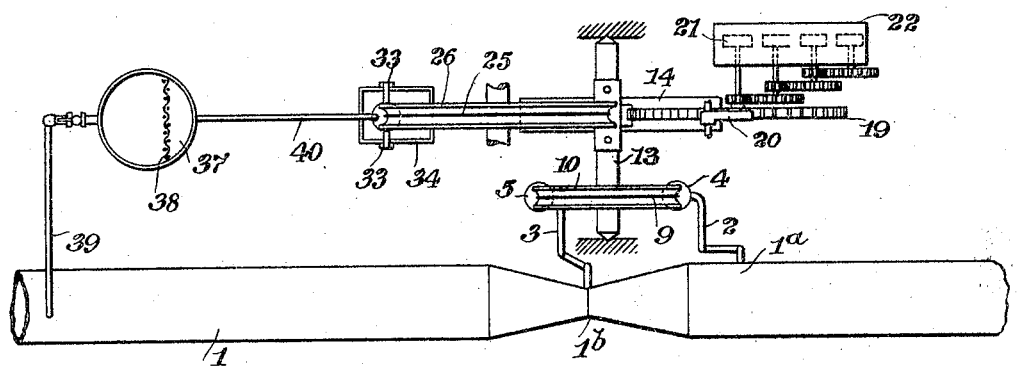
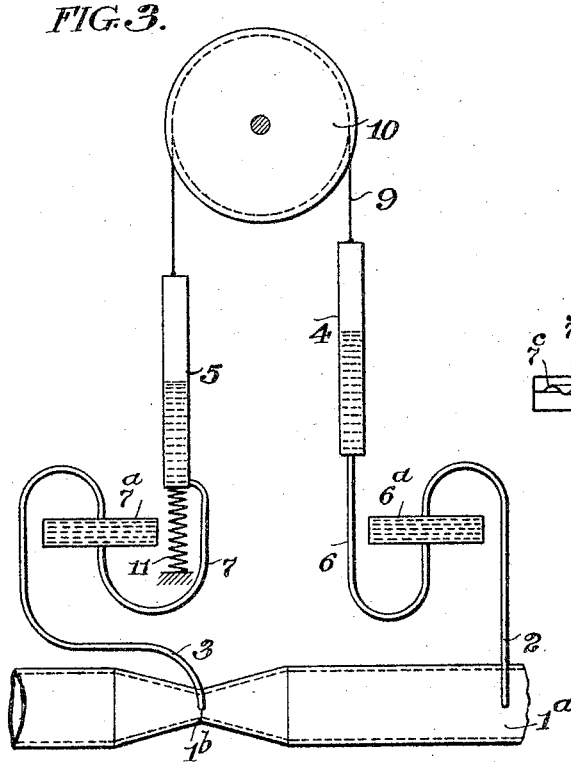
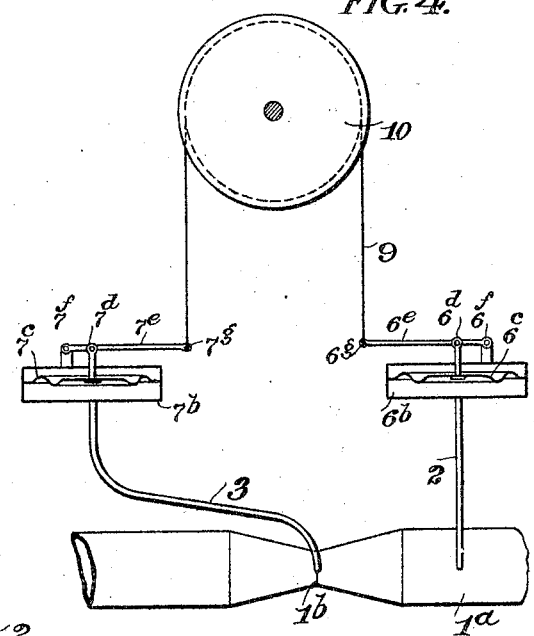
WITNESSES:
INVENTOR
J. W. Ledoux
BY
C. N. Butler
ATTORNEY.

No. 770,297. PATENTED SEPT. 20, 1904.
J. W. LEDOUX.
FLUID METER.
APPLICATION FILED JULY 11, 1903.
NO MODEL. 3 SHEETS—SHEET 3.
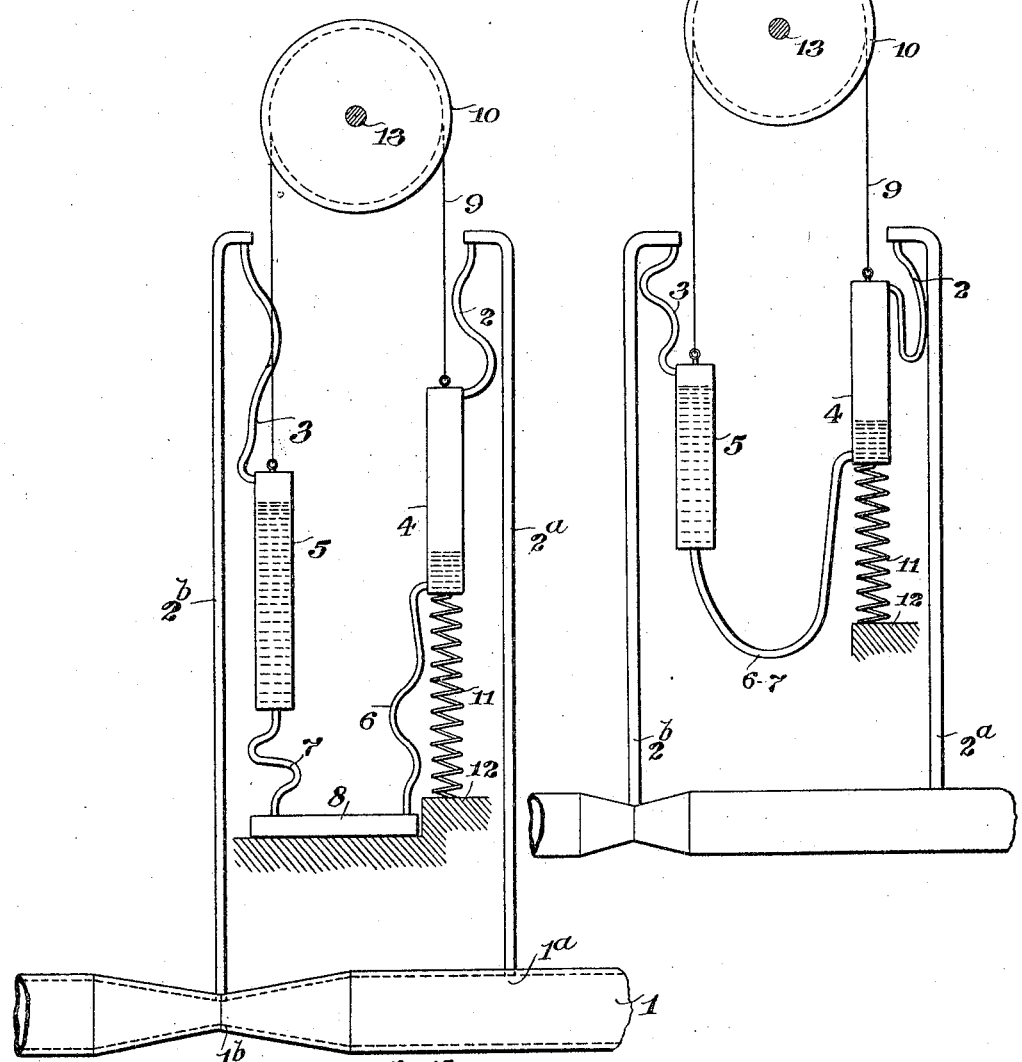

No. 770,297. Patented September 20, 1904.

UNITED STATES PATENT OFFICE.

JOHN W. LEDOUX, OF SWARTHMORE, PENNSYLVANIA.

FLUID-METER.

SPECIFICATION forming part of Letters Patent No. 770,297, dated September 20, 1904.

Application filed July 11, 1903. Serial No. 165,062. (No model.)

*To all whom it may concern:*

Be it known that I, JOHN W. LEDOUX, a citizen of the United States, residing at Swarthmore, in the county of Delaware and State of Pennsylvania, have invented certain Improvements in Fluid-Meters, of which the following is a specification.

This invention relates to the measurement of fluids, particularly water, by means of the variation in pressure due to variations in the velocity of flow; and its primary purpose is to produce improved mechanism adapted to be regulated to indicate the flow by the resultant pressures due to changes in velocity or velocity-head.

It being the law that in a conduit having a conically-contracted section the pressure of flow at the contracted section is less than at the normal section, the difference in pressure increasing as the velocity increases, it is a purpose of the present invention to determine the flow by the utilization of such variations in pressure for the regulation of the rate of indication of an otherwise regularly-operating register.

It is also a purpose of the invention to determine the flow through an open conduit, an orifice, or over a weir or dam, as well as through pipes and closed conduits, the improvements being adapted for effecting the registration of the flow as the same is influenced by changes of head.

The nature and characteristic features of the improvements will more fully appear by reference to the following description and the accompanying drawings in illustration thereof, of which—

Figure 1:
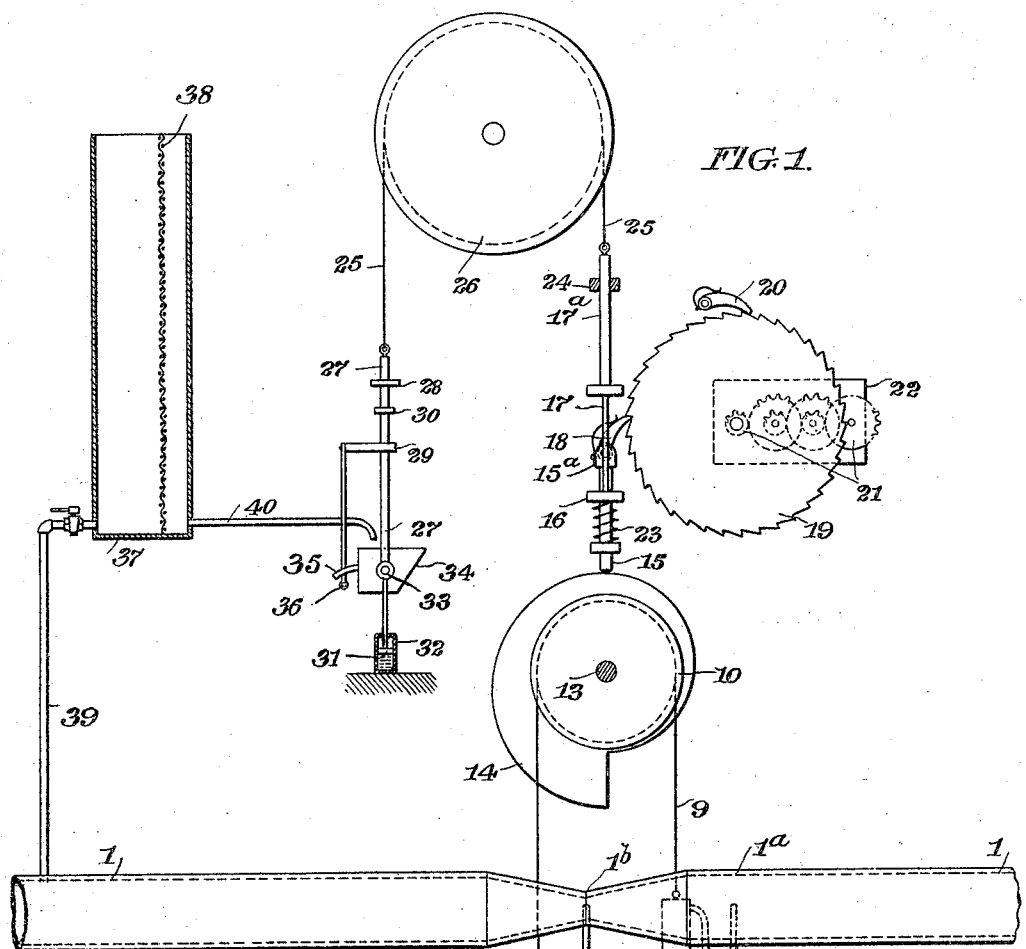
Figure 7:
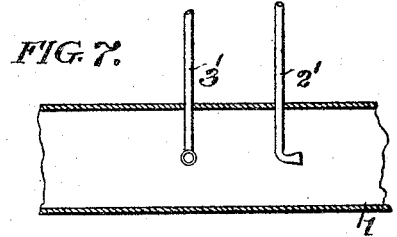
Figure 8:
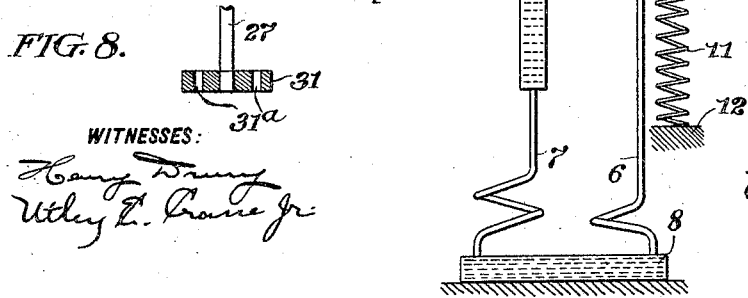

Figure 1 represents a diagrammatic illustration of a meter embodying the invention. Fig. 2 represents a plan view of the construction shown in Fig. 1. Fig. 3 represents a modification of the construction shown in Fig. 1. Fig. 4 represents a modification of the construction shown in Fig. 3. Fig. 5 represents a further embodiment of the invention. Fig. 6 represents a modification of the construction shown in Fig. 5. Fig. 7 represents a detail view showing the application of Pitot tubes in the invention. Fig. 8 represents a detail sectional view of the dash-pot piston. Fig. 9 represents the application of the improvements to the measurement of flow through an open conduit, an orifice, a weir, or a dam.

As shown in the drawings, referring particularly to Figs. 1 and 2, the conduit 1 has its normal section at $1^a$ and its contracted section at $1^b$ respectively connected by the flexible tubes 2 and 3 with the upper ends of the pressure-reservoirs or mercury-tubes 4 and 5, whose lower ends are connected together by the flexible tubes 6 and 7 and the stationary conduit 8. The tubes 4 and 5 are supported by a cord 9, which passes over a pulley 10, and are balanced by a spring 11, having one end connected to the tube 4 and the other end fixed to an anchor 12. The pulley 10 is fixed to an arbor 13, having a cam 14 fixed thereon. In the path of the periphery of the cam is a pin 15, adapted to reciprocate in a bearing 16 of a reciprocating guide 17, the pin having a head $15^a$, adapted to be engaged by the bearing 16, and a spring-pressed pawl 18, adapted to advance a ratchet-wheel 19, which is held against retrograde movement by the spring-pressed pawl 20 and drives the gear-train 21 of a register 22. The spring 23, having one end connected to the pin 15 and the other end connected to the guide 17, may be used to aid gravity in carrying the pin downward through its bearing into contact with the periphery of the cam. The guide stem or rod $17^a$ is adapted to reciprocate in a bearing 24 and is supported by a cord 25, passing over a pulley 26 and engaging a rod or frame 27, which reciprocates in stationary bearings 28 and 29, the movement of the part 27 being limited by the engagement of the stops 30 thereon with the stationary bearings. A piston 31, having the passages $31^a$ therethrough, Fig. 8, is fixed on the lower end of the frame and reciprocates in the cylinder or dash-pot 32, by which the movement of the frame and the guide connected therewith are regulated and guarded against shock. Connected with the frame by the trunnions 33 is a bucket 34, having thereon a projection 35, adapted to engage in its downward movement a stationary stop 36, by which the bucket is tilted. An open-topped tank 37, containing a screen 38, is connected on one side of the screen by the pipe 39 with the conduit 1, and on the other side of the screen it is provided with the pipe 40, emptying into the bucket, which is filled thereby in a definite period.

It will be understood that the form of clock mechanism may be varied without departing from the spirit of the invention, it being obvious that various forms of such mechanisms may be employed for effecting the regular movement of the register at definite intervals.

As shown in Fig. 3, the tubes 4 and 5 have their upper ends closed to confine air therein or they may be opened to the atmosphere if made of sufficient height. Their lower ends are connected by the flexible tubes 6 and 7 with the reservoirs $6^a$ and $7^a$, and the respective reservoirs are connected by the tubes 2 and 3 with the conduit-sections $1^a$ and $1^b$.

As shown in Fig. 4, the conduit-sections $1^a$ and $1^b$ are connected by the tubes 2 and 3 with the pressure-reservoirs $6^b$ and $7^b$, containing the diaphragms $6^c$ and $7^c$, having the respective pivotal connections $6^d$ and $7^d$ with the levers $6^e$ and $7^e$, fulcrumed at the pivotal points $6^f$ and $7^f$ and connected at the points $6^g$ and $7^g$ with the cord 9.

As shown in Fig. 5, the conduit 1 has its sections $1^a$ and $1^b$ connected with the vertical pipes $2^a$ and $2^b$, extending upwardly therefrom and having their upper ends connected by the flexible tubes 2 and 3 with the mercury or pressure tubes 4 and 5.

As shown in Fig. 6, the lower ends of the pressure-tubes 4 and 5 are connected by the depending flexible tubes 6 7.

As shown in Fig. 7, the conduit 1 is tapped by the Pitot tubes 2' and 3', which are respectively turned at right angles to and in the direction of the flow.

As shown in Fig. 9, the cord 9 has one end connected with a weight 50, and the other end supports a float 51, the position of the float regulating the position of the pulley 10 and cam 14, by which the downward movement of the pin 15 is regulated. The float 51 is carried upon the surface of water or other fluid flowing through an open conduit, over a dam, or through a weir 52 or an orifice, such as formed by the weir and the slide 53. As the head increases the float rises therewith to effect the indication of the corresponding increase in flow by increasing the throw of the pin 15.

It being the law that the pressure of water flowing through the conduit is greater in the tube 2 or 2' than in the tube 3 or 3' and that the difference in pressure increases with the increase of the velocity of flow through the conduit, it will be understood that the columns of mercury in the respective tubes 4 and 5 will vary in height and weight inversely as the water-pressure therein, or as the velocity increases the mercury will be driven from the tube 4 into the tube 5, the tube 4 will rise and the tube 5 will fall as the variation in their weights affects the expansion of the balancing-spring 11, and the pulley 10 and the cam 14 will be revolved thereby, or a change of head in an open conduit will effect a movement of the float 51 and a corresponding movement of the cam 14. The downward movement of the pin 15 will be regulated by the position to which the cam is turned, the higher points of the cam being moved under the pin to reduce the downward movement of the latter with the decreasing flow and the lower points of the cam moved under the pin to increase the downward movement with the increasing flow. As the reciprocating guide 16 moves through a fixed distance, limited by the stops 28 and 29, the pin 15 and the pawl 18 are elevated thereby to a fixed point. Hence the variation in the downward movement of the pin varies its throw, thus varying the arc through which the ratchet-wheel 19 is advanced and the amount indicated at each stroke by the register 22. As the flow of water through the pipe 40 is induced by a constant head and the bucket 34 is filled in a definite period, the latter descends at definite or constant intervals to elevate the guide 17 and rod 15, by which the register is actuated. As the filled bucket descends it is tilted and emptied, to be again elevated by the weight of the guide 17, righting itself and again being filled to reactuate the register. The pin 15, which is elevated at regular intervals by the guide 17, opposes little or no frictional resistance to the movement of the cam 14, which is sensitive in its movement and free to respond to slight variations in pressure.

It will be understood that various modifications may be made in the details of construction without departing from the spirit of my invention, which contemplates in its leading aspect the use of a by-pass or auxiliary conduit connecting sections of a main conduit having different areas subject to different velocity-heads and employing an indicator for measuring the flow by means of the variations of or resultant pressure in the by-pass or auxiliary conduit.

Having described my invention, I claim—

1. A meter comprising an indicating device, mechanism for uniformly actuating said indicating device, and mechanism comprising a pair of pressure-reservoirs operated by varying pressures in a conduit for regulating the rate of said indicating device, substantially as specified.

2. A meter comprising a pair of reservoirs, rectilineally reciprocated by variations of pressure therein, means for balancing said reservoirs, a fluid connection between said reservoirs, a conduit, a fluid-passage connecting each of said reservoirs with said conduit, and indicating mechanism regulated by the movement of the reservoirs to the position of equilibrium, substantially as specified.

3. A meter comprising rectilineally-reciprocating tubes, means for balancing said tubes, a fluid connection between said tubes, mechanism for communicating pressure to said tubes, and indicating mechanism regulated by the movement of said tubes, substantially as specified.

4. A meter comprising a pair of pressure-tubes, means for balancing said tubes, a fluid-passage connecting said tubes together, a fluid-passage connecting each of said tubes with a conduit, an indicator, and mechanism operated by the equilibrating movement of said tubes to regulate the movement of said indicating device, substantially as specified.

5. A meter comprising a pressure-reservoir connected with a conduit, a balance connected with said reservoir and operated by the pressure therein, a cam connected with and operated by said balance, an indicating device, and mechanism connecting said indicating device with said cam by which said cam effects the regulation of said indicating device, substantially as specified.

6. A meter registering mechanism comprising a cam, a reciprocating guide, a pin reciprocating in said guide and adapted to make contact with said cam, a register, and mechanism by which said pin operates said register, substantially as specified.

7. A meter registering mechanism comprising a cam, a reciprocating guide, a register, and a reciprocating device operated by said guide and controlled by said cam for actuating said register, substantially as specified.

8. A meter registering mechanism comprising a cam, a reciprocating guide, a pawl having means adapted to be actuated by said guide and controlled by said cam, a ratchet operated by said pawl, and a register operated by said ratchet, substantially as specified.

9. A meter comprising a register, a mechanism for operating said register, a reciprocating vessel connected with and operating said mechanism, a receptacle for filling said vessel at a constant rate, said receptacle having an overflow, and mechanism whereby said vessel is emptied when filled, substantially as specified.

10. A meter comprising a tank having an overflow adapted for maintaining a constant head therein, a reciprocating vessel adapted to be filled from said tank at definite intervals, tilting mechanism whereby said vessel is emptied at definite intervals, mechanism for controlling the reciprocations of said vessel, and a register connected with and operated by the reciprocation of said vessel, substantially as specified.

11. A meter comprising a register, a pawl-and-ratchet mechanism for operating said register, a water-clock actuated by a constant head of water for driving said register, and mechanism operated by varying pressure for regulating the rate of said register, substantially as specified.

In testimony whereof I have hereunto set my hand, this 10th day of July, A. D. 1903, in the presence of the subscribing witnesses.

JOHN W. LEDOUX.

Witnesses:
 LIDA C. GRANT,
 UTLEY E. CRANE, Jr.